(12) United States Patent
Bharadwaj

(10) Patent No.: US 10,234,960 B1
(45) Date of Patent: Mar. 19, 2019

(54) VARIABLE RESPONSE KEY AND KEYBOARD

(71) Applicant: Apple Inc., Cupertino, CA (US)

(72) Inventor: Shravan Bharadwaj, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/490,115

(22) Filed: Apr. 18, 2017

(51) Int. Cl.
*G06F 3/02* (2006.01)

(52) U.S. Cl.
CPC ............ *G06F 3/0216* (2013.01); *G06F 3/021* (2013.01); *G06F 3/0213* (2013.01)

(58) Field of Classification Search
CPC ....... G06F 3/0216; G06F 3/0213; G06F 3/021
See application file for complete search history.

(56) References Cited

U.S. PATENT DOCUMENTS

| | | | | |
|---|---|---|---|---|
| 5,717,423 A * | 2/1998 | Parker | ................... | G06F 3/016 345/108 |
| 7,382,357 B2 * | 6/2008 | Panotopoulos | ....... | G06F 3/0202 345/168 |
| 2005/0057528 A1 * | 3/2005 | Kleen | ................... | G06F 3/016 345/173 |
| 2007/0182718 A1 * | 8/2007 | Schoener | ............... | B60K 35/00 345/173 |
| 2008/0158172 A1 * | 7/2008 | Hotelling | .............. | G06F 1/3231 345/173 |
| 2009/0039309 A1 * | 2/2009 | Bose | ....................... | F16F 1/361 252/62.55 |
| 2010/0031803 A1 | 2/2010 | Lozada et al. | | |
| 2011/0074691 A1 * | 3/2011 | Causey | ................... | G06F 3/016 345/169 |
| 2014/0104047 A1 * | 4/2014 | Bolzmacher | ............ | G06F 3/016 340/407.2 |
| 2014/0320431 A1 * | 10/2014 | Cruz-Hernandez | ..... | G06F 3/041 345/173 |
| 2014/0331804 A1 * | 11/2014 | Pfeifer | .................... | F16H 59/12 74/473.3 |
| 2016/0118203 A1 * | 4/2016 | Moua | ................... | H01H 13/705 307/115 |
| 2016/0216762 A1 * | 7/2016 | Vanhelle | ................ | B60K 37/06 |
| 2018/0229704 A1 * | 8/2018 | Eck | .......... | G06F 3/016 |

FOREIGN PATENT DOCUMENTS

| | | |
|---|---|---|
| EP | 1548776 | 6/2005 |
| KR | 20100083248 | 7/2010 |
| WO | WO2016/050718 | 4/2016 |

* cited by examiner

*Primary Examiner* — Mihir K Rayan
(74) *Attorney, Agent, or Firm* — Dorsey & Whitney LLP

(57) ABSTRACT

An electronic device can include a key and/or a keyboard system. In one embodiment, magneto-rheological materials are employed to provide a variable response keyboard of an electronic device.

20 Claims, 10 Drawing Sheets

VARIABLE RESPONSE KEY AND KEYBOARD

FIELD

The described embodiments relate generally to electronic devices. More particularly, the present embodiments relate to keys and keyboard systems in electronic devices. Still more particularly, the present invention relates to the use of variable response materials to provide a variable response keyboard of an electronic device.

BACKGROUND

Many electronic devices employ keyboards. Keyboards are configured with a standardized set of keys to enable predictable and rapid data entry, such as typing by way of a QWERTY keyboard. Conventional keyboards typically provide a uniform input force response profile for all keys. That is, the stiffness, travel, height (or other dimension) and/or damping characteristics of each key are common. Mechanical springs or other mechanical mechanisms are typically used below each key to provide the input response. Because the key response often is uniform for all keys, some users may experience fatigue in relatively weaker fingers or experience double entry of keys pressed by relatively stronger fingers. Also, some users would prefer an alternate key response based on typing speed or nominal typing input force, e.g. a less stiff keyboard or with increased damping. Furthermore, mechanical mechanisms may change properties over time or with excessive use. For example, springs fixed below keys frequently used by index fingers, typically the strongest finger of a user, may tend to wear more rapidly, causing a reduced stiffness and/or increased damping.

A user may prefer a variable key response keyboard that varies with the finger being used, key type, and/or key position, and/or an adaptable key response that adapts to a user's typing input style and does not degrade or alter response with usage. A variable response keyboard may reduce user fatigue in that the keyboard force profile may be tuned on a per-finger basis, so as to require, for example, less force for key entry for weaker fingers. The variable response keyboard controls per-key response profiles by way of magneto-rheological (MR) materials.

SUMMARY

In one aspect, an input device configured to receive an input force is disclosed, the input device comprising: an input surface; a variable response material adjacent the input surface; a magnetic field source adjacent the variable response material; and a controller configured to control the magnetic field source; wherein the magnetic field source is configured to generate a magnetic field to adjust one or more material properties of the variable response material, thereby varying a response of the input surface to the input force.

In one aspect, the variable response material is a magneto-rheological elastomer. In one aspect, the one or more material properties comprise at least one of stiffness, travel distance, or damping. In one aspect, a value of each of the one or more material properties is user-defined. In one aspect, the input device further comprises a proximity sensor operative to detect proximity of an object to the input surface. In one aspect, the response of the input surface comprises a movement of the input surface in a direction in which an object is traveling toward the input surface. In one aspect, the variable response material is one of a group of magneto-rheological materials adjacent the input surface. In one aspect, the input surface is a surface of a trackpad. In one aspect, the magnetic field source is an electromagnet.

In another aspect, an input device is disclosed, the input device comprising: a group of input surfaces, each configured to travel in response to an input force; and a variable response material disposed below each input surface, the variable response material associated with multiple input force response profiles for each input surface; wherein, when variable response material of a particular input surface of the group of input surfaces is subject to a magnetic field: a material property of the variable response material changes; and an input force response profile of the particular input surface changes.

In one aspect, each of the group of input surfaces is a key cap, and the variable response material is a magneto-rheological material. In one aspect, the input device of claim 10, wherein an elasticity of the variable response material decreases when the variable response material is subject to the magnetic field. In one aspect, the material property is height. In one aspect, the input device further comprises a first electromagnet disposed adjacent a first side of the variable response material; and a second electromagnet disposed adjacent a second, non-opposing side of the variable response material. In one aspect, the input device further comprises a first set of electromagnets configured to subject the variable response material to a first magnetic field; a second set of electromagnets configured to subject the variable response material to a second magnetic field; and a proximity sensor configured to detect a proximity of an object adjacent the input surface; wherein: the group of input surfaces comprise key caps of a keyboard; the material property is a stiffness; the variable response material is a magneto-rheological material; the stiffness decreases when subject to the first magnetic field; and the stiffness increases when subject to the second magnetic field.

In another aspect, an input device is disclosed, the input device comprising: a group of input surfaces; a group of variable response materials, each of the group of variable response materials corresponding to one of the group of input surfaces and defining a unique input force response profile; a controller; and a magnetic field source controllable by the controller, the magnetic field source in magnetic communication with the group of variable response materials; wherein the controller is configured to adjust the unique input force response profile of each of the group of input surfaces by varying an electromagnetic field produced by the magnetic field source.

In one aspect, the variable response material is a magneto-rheological material; the magnetic field source is an electromagnet; each of the group of input surfaces is an input node; and each of the unique input force response profiles defines an elasticity and a damping for a unique one of the group of magneto-rheological materials. In one aspect, the controller is further configured to adjust each unique input force response profile by adjusting at least one of the elasticity or the damping. In one aspect, the group of input surfaces are disposed on a sphere. In one aspect, each of the group of variable response materials affixes a corresponding one of the group of input surfaces to a corresponding substrate.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1:
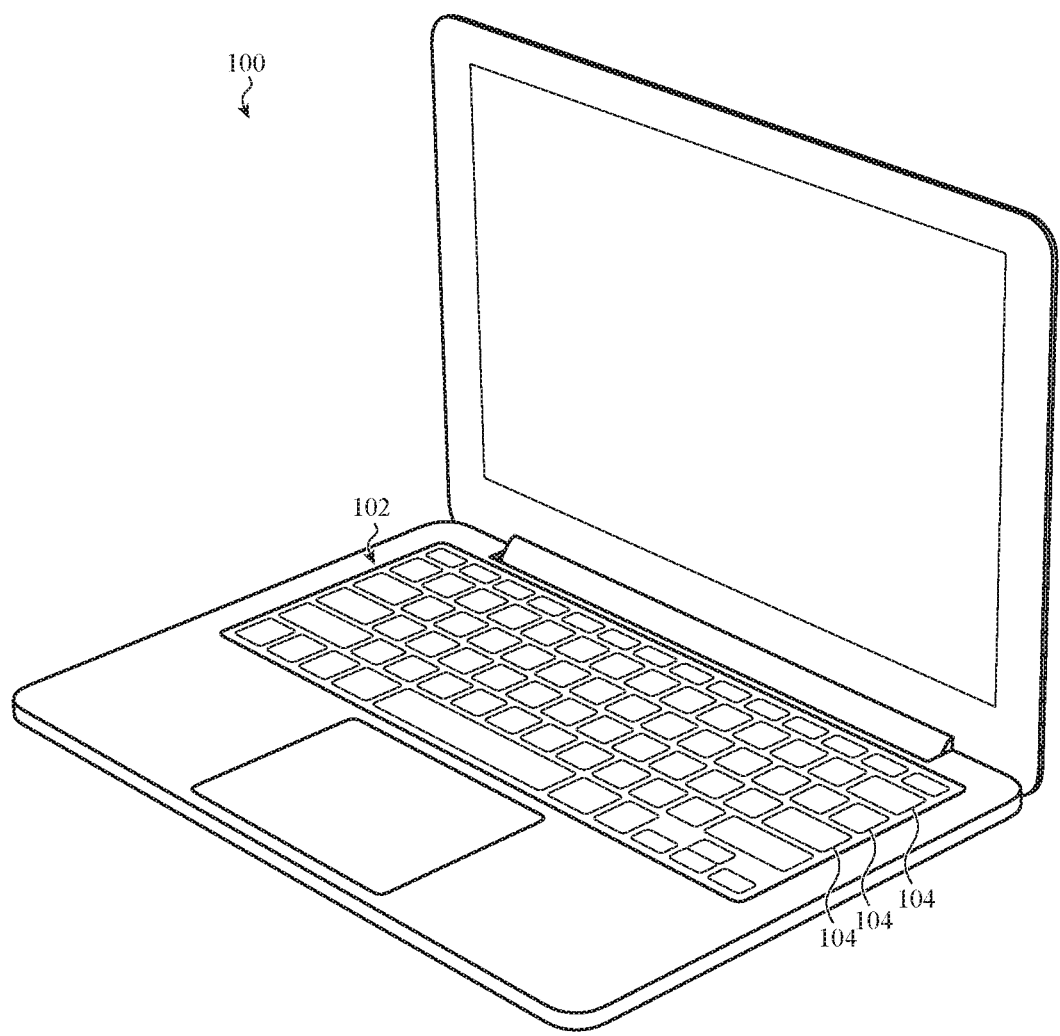
FIG. 1 illustrates one example of an electronic device 100 with a smart keyboard 102 including smart keys 104.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure generally relates to a "smart" input device used in electronic devices. A smart input device may vary certain operational parameters or adjust material properties to provide a different feel or response when it receives an input force. A smart input device may be stiffer, travel less, move differently, or otherwise react differently to a received input force as a property of the smart input device is varied.

For example, in one embodiment, a smart keyboard including a group of keys is disclosed, the smart keyboard providing a variable or adaptable output (or other response) in response to a force exerted on an input surface. Here, a smart input device is a device which utilizes smart or "variable response" materials to provide particular feel or response when an input is received; a smart or variable response material changes material properties based on operational states, characteristics or external inputs. By controlling certain system characteristics (e.g. temperature, pressure, humidity, magnetic field strength, presence of electricity, and so on), properties of the variable response material likewise may be controlled. Such variable response materials may be incorporated into the input device to provide variable or adaptable response. For example, the variable response material may be disposed below an input surface of the input device, integrated within the input surface, or the like.

Electronic circuits, processors, and/or mechanical systems may control or adjust such characteristics, which in turn may adjust a material property or operational state of the material. A "material property," as used herein, is a physical or structural characteristic of a material. Stiffness, hardness, compressibility, volume, dimension (e.g., height, width, length), elasticity, shape, and other mechanical, structural, and/or physical properties are all examples of material properties.

As one non-limiting example of adjusting a material property of a variable response material, an electromagnetic coil or other magnetic field source may be actuated to produce a magnetic field, thereby stiffening a magneto-rheological material as described herein. Such stiffening may occur by aligning the magnetic particles within the magneto-rheological material along the flux lines of the magnetic field. This causes the material to be stiffer in response to force exerted on a face of the material perpendicular to the aligned particles than would be the case if the particles were not aligned.

As another non-limiting example, a coil spring of a smart or variable response material may change stiffness with applied temperature. Such a spring may be housed in a temperature-controlled environment, such that spring stiffness may be adjusted through a temperature control unit, in turn allowing adjustment of material properties of a device engaged with the smart spring.

Generally, an "input surface" is any surface configured to receive an input, such as a force or a touch. A key cap may define an input surface, as may a trackpad surface, button exterior, switch, mouse housing, and so on. An "input device" is any device configured to receive an input and facilitate generating an output in response. Sample input devices include individual keys, a keyboard (which may be considered a single input device or a collection of input devices), a trackpad, a mouse, a button, and so on.

The disclosure more specifically relates to variable response input devices, such as variable response keys and keyboards of electronic devices, or variable or adaptable input nodes of an input device. "Input nodes" are generally any structure or location responsive to an input. Certain features and functions of how an input device responds to an input force may be adjusted by implementing or forming part of the input device from a variable response material. The input device may be made to travel further or less in response to an input force, or be made stiffer or more elastic, by adjusting material properties of the variable response material.

As one example, a variable response key or keyboard is disclosed. Such a keyboard employs a variable response material, such as a magneto-rheological (MR) material, to control individual key response profiles. MR materials can change shape, mechanical moduli, and other material properties rapidly and reversibly, under passive influence of an external magnetic field. MR materials are considered smart materials because they can respond to changes in system characteristics, as controlled by electronics and control systems.

The MR material is disposed below a key cap of a key, or below an input surface such that the MR material corresponds to the input surface. A controllable magnetic field adjusts the MR material properties to vary a response of the key to the input force; for example, damping, travel distance, and/or stiffness are all MR material properties that can be adjusted, thereby varying the response to the input force.

Continuing the example, a particular MR material may exhibit different mechanical properties when subjected to a vertically-oriented magnetic field of a given strength. Metallic particles within the MR material may, for example, vertically align with the magnetic field, producing an increased stiffness in the vertical direction. The strength of the vertical magnetic field may align the metallic particles along the field lines, thereby increasing the stiffness of the MR material and providing more resistance to an input force. The stiffness of the MR material thus is adjusted by the strength of an external magnetic field.

Accordingly, by adjusting a material property of an MR material (e.g., its stiffness), a response of a corresponding key of a keyboard to an input force may be varied or otherwise controlled. By implementing multiple smart keys or input surfaces, a unique input force response profile for each such key/input surface may be established. Note that in addition to the strength of a magnetic field, the orientation of the magnetic field will influence the MR properties. For example, a magnetic field of a given strength may be oriented at 30 degrees from vertical. If the magnetic field is then re-oriented to 10 degrees from vertical, while maintaining the same strength, the resultant vertical component of the magnetic field strength will increase, thereby causing an increase in the vertical stiffness of the MR material.

As another example, a variable response key is disclosed that employs a matrix of variable response materials, such as magneto-rheological materials, to control per-key response profiles. The matrix of MR materials may be a matrix of elements of the same material under individual control by discrete magnetic fields, a matrix of elements of different material under control by a common set of magnetic fields, or a combination of both. A matrix of MR materials enables, for example, a per key geometry to be formed on a key face. For example, a key face geometry may be contoured to an individual finger. A matrix of MR materials disposed below a key cap may enable increased performance over a single MR material. One or more of the matrix or group of MR materials may be disposed adjacent to one another. For example, a matrix of MR materials allows use of a MR materials specialized for a particular mechanical modulus. A first MR material may exhibit a larger stiffness range than a second MR material, while the second MR material may exhibit a larger range of damping than the first material. By use of a matrix of both the first and the second material, the larger range of both damping and stiffness may be provided. More details of embodiments including a matrix of MR materials are provided below.

A variable response input device, for example a key of a keyboard, may allow a user to set a unique input response force profile of the key. For example, a user may prefer that a particular key (or other input device) have a "light" response, meaning a relatively low stiffness and minimal damping, in response to receiving a particular input force. This may be useful if the key is engaged by a relatively weak finger (such as a little finger of a user employing conventional typing techniques.) Similarly, a user may prefer a key have a "hard" response, meaning a relatively high stiffness and increased damping, for a key that is conventionally engaged by a relatively strong finger (such as an index finger.) Thus, the response of each input device may vary from one another when receiving the same input force.

The phrase "variable response" key, keyboard, or input surface means a key or group of keys, or an input surface or group of input surfaces, forming a keyboard or another suitable input device in which the response of the key(s), or input surface(s), to an input force is selectable or tunable. For example, a user, application, operating system, or the like may select a first set of stiffness and damping for a first key, and a second set of stiffness and damping for a second key.

Further, a variable response key, keyboard, or input device may have a response that changes or adapts based on monitoring of input and/or kinematic response. For example, if monitoring sensors identify that a user is routinely deleting and back-spacing to input a particular letter key of a keyboard, that key may be too stiff and thus require too high an input force from the user, resulting in missed key inputs. To address the problem, the variable response keyboard may increase the responsiveness of the particular key by decreasing the stiffness of that key.

A variable response keyboard or input device may vary or otherwise alter a response of the entire keyboard or individual keys to an input force, based on any of several system characteristics or operational conditions. For example, a user operating a keyboard of a laptop device on an airplane tray table might engage a keyboard differently than when operating the same keyboard in a home office. Given the limited room on an airplane tray table, a user may orient his or her fingers slightly more upright. This may result in greater input forces exerted on input surfaces, such as key caps, trackpad surfaces, buttons, and so on. An adaptable keyboard may sense the increase in input forces to the input surface(s), and automatically adjust the response profile of the entire keyboard to provide a response profile with increased damping to account for the higher input forces. As such, the variable response keyboard may compensate for the higher input forces such that the keyboard responds in the same manner as in a home office. Thus, a unique input force response profile may be selected from multiple input force response profiles. An "input force response profile," or simply "response profile," refers to how a key (or other input device) reacts when an input force is applied to it. For example, the amount of force required to generate an input signal is one input force response profile. Likewise, the travel of an input surface in response to an input force is another example of an input force response profile. Travel distance, changes in stiffness/elasticity, damping, and/or changes in dimension of an input surface, or associated input device, in response to an input force are all examples of different input force response profiles.

A variable response keyboard or input device provides performance and operational advantages when used with electronic devices. For example, a variable response keyboard, in which input force response is tuned to a unique input force profile of each key or each user finger, may reduce user fatigue by allowing weaker fingers to provide less force for a valid key input. Also, by adapting the keyboard to changing levels of input force (e.g. the above example scenario), the user experience may be improved because the keyboard operates in a more predictable manner. Additionally, a variable or adaptive response keyboard that employs smart materials may reduce noise associated with the springs, scissors, domes, or metallic collapsible mechanical elements used in the keys of conventional keyboards.

These and other embodiments are discussed below with reference to FIGS. 1-9. However, those skilled in the art will readily appreciate that the detailed description given herein with respect to these figures is for explanatory purposes only and should not be construed as limiting.

FIG. 1 illustrates one example of an electronic device 100, configured as a laptop. The electronic device includes a keyboard 102 including a group of lettered keys 104. By force input to a sequence of keys, a user enters or types a sequence of letters to form a word. A touch typist typically types using a mapping of fingers to lettered keys. Each finger is assigned a set of numbered keys. For example, the right index finger is typically assigned the lettered keys y, u, h, j, n, and m, and the numbered keys 6 and 7 (for a QWERTY keyboard.) The electronic device 100 can also include one or more internal components (not shown) typical of a computing or electronic device, such as, for example, one or more processors, memory components, network interfaces, and so on.

The keyboard 102 may be a conventional QWERTY keyboard, although other keyboard configurations are possible, for example a DVORAK or AZERTY keyboard, specialized key-entry devices, for example a steno keyboard, and numbered keyboards. One or more keys 104 of the keyboard 102 may be a smart key, as discussed in more detail with respect to FIGS. 2-6.

As shown in FIG. 1, the electronic device 100 is implemented as a laptop. Other embodiments, however, are not limited to this type of electronic device. Other types of computing or electronic devices can include a keyboard for a netbook, a phone, a tablet computing device, a wearable computing or display device (such as glasses, jewelry, watches, clothing or the like) a digital camera, a printer, a scanner, a video recorder, a copier, a touch screen, and the like.

Figure 2:
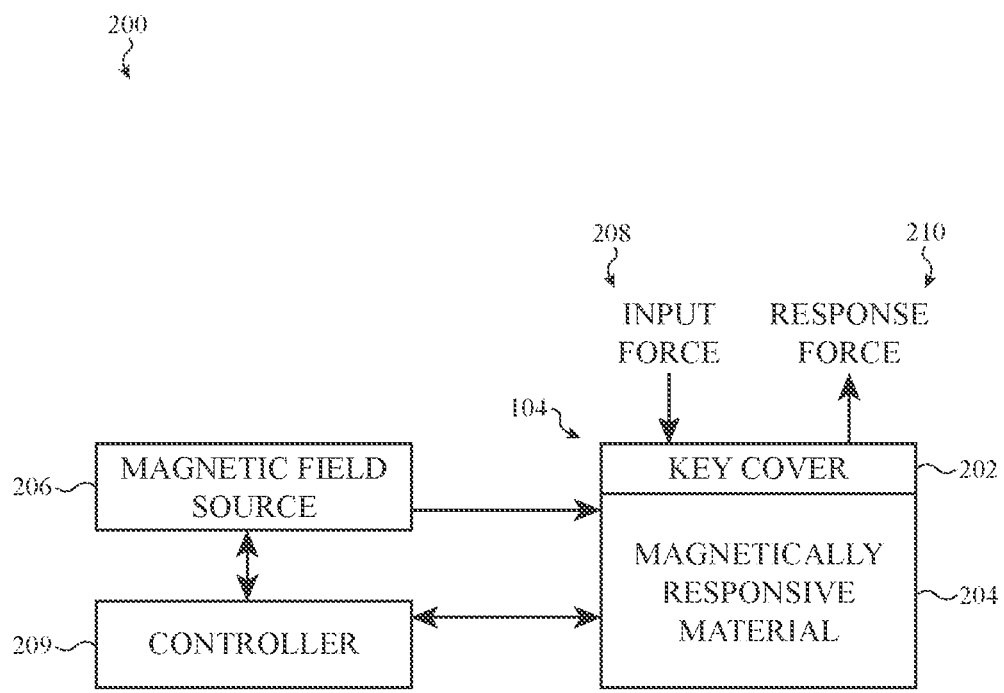
FIG. 2 provides a schematic diagram of an example smart keyboard system 200 according to various embodiments.

FIG. 2 provides a schematic diagram of an example smart keyboard system 200 according to various embodiments. The smart keyboard system 200 includes a key 104 with an MR variable response material 204, magnetic field source 206, controller 209, and a key cap 202 configured to receive an input force 208 on an input surface of the key cap 202. Generally, the input force (e.g. a force provided by a user, typically through a press or a touch by a user's finger), serves as an input to an electronic device 100. The key cap is disposed on or above a magneto-rheological material 204 which is responsive to the magnetic field source 206. By controlling the magnetic field source 206 by way of the controller 209, the material properties of the magneto-rheological material 204 may be varied such that the response force 210 to input force 208, as applied to the input surface, may in turn be varied. Thus, a unique input force response profile, from a set of multiple input force response profiles, may be established.

Magneto-rheological (or magnetorheological) materials can be deformed or otherwise have their mechanical properties, such as elasticity and damping values, adjusted as a function of an external magnetic field. Generally, magneto-rheological materials include a carrier material or fluid and embedded magnetically-sensitive materials. When not under the influence of a magnetic field, the free state of the MR material exhibits a first or nominal set of material properties. However, when under the influence of a magnetic field, the MR material changes material properties to a different set of values. The material properties may span a range of values as a function of the degree and orientation of the applied magnetic field. For MR gels or elastomers, the shape of the MR material changes with applied magnetic field. The "value" is thus the particular level, amount, or measurement of a material property.

Magneto-rheological materials include elastomers, gels, and fluids, depending on the carrier used to embed the magnetically-sensitive particles. When a magnetic field is applied, the magnetically-sensitive particles reconfigure to align with the magnetic field, thereby changing the internal structure of the magneto-rheological material and thus the structural properties. For example, a magnetic field that imparts a set of vertical magnetic field lines to a magneto-rheological material will align the magnetically-sensitive particles in a vertical direction. Such particles will typically exhibit stiffer stress-strain properties than the carrier material, thereby increasing the stiffness of the MR material in the vertical direction. The magneto-rheological material will thus be stiffer, or harder, in the vertical direction, and relatively more input force will be required in the vertical direction to cause the same vertical travel of an associated input surface or input device.

Magneto-rheological elastomers, also known as magneto-sensitive elastomers, are solids with embedded magnetically-sensitive particles. The particles of a magneto-rheological elastomer are typically micro- or nano-sized, and may include so-called ferromagnetic particles. Ferromagnetic particles exhibit very high magnetic permeability, and may exhibit a predictable saturation point, which is a point at which material properties no longer change with increases in magnetic force. For example, ferromagnetic particles may include iron, nickel, and cobalt. In one embodiment, the magnetically-sensitive particles of a magneto-rheological elastomer may include carbonyl iron. Magneto-rheological elastomers may deform and/or change mechanical moduli under a magnetic field, returning to a nominal shape and set of mechanical moduli when not under a magnetic field. An advantage of magneto-rheological elastomers over magneto-rheological fluids is that magneto-rheological elastomers do not need containers, as are typically required by magneto-rheological fluids. Although the embodiments of the disclosure reference magneto-rheological elastomers, embodiments using MR gels and/or MR fluid are possible. For embodiments employing magneto-rheological gels or fluids, a container for the magneto-rheological gels or fluids may be implemented.

The response force 210 of the key 104 to a given input force 208 applied to an input surface of the key 104 is governed by the input force 208 and the properties of the magneto-rheological material 204. Generally, the key 104 (and by association a key cap and/or another input surface attached to the key) may be considered a single-degree-of-freedom mass system, in which the mass is subject to an input force, a damper, and a spring. A single-degree-of-freedom system is a system whose motion is defined by a single independent coordinate as a function of time. The vertical motion of the key 104 is the single independent coordinate in a model of a response of the key 104 to an input force 208. The stiffness K and damping C values of the magneto-rheological material operate as a spring and damper, respectively, on the motion of the key 104 mass. Generally, a higher value of stiffness K requires a larger input force 208 to make a key travel a given amount, and a larger damping value C results in a slower return of the key 104 from a given travel. Thus, as the stiffness and/or damping of the key change with application of a magnetic field, a response of the key to an input force likewise changes. For example, the key (or other input device) may travel less or more in response to a given input force.

Magneto-rheological material properties, such as stiffness K and damping C, may be adjusted or controlled through interaction with the magnetic field of the magnetic field source 206. Also, the geometry of the magneto-rheological material, e.g. the thickness or vertical dimension of the MR material, may also be adjusted or controlled by way of a magnetic field. For example, a magneto-rheological material may include particles that respond to a magnetic field by displacing in the direction of the magnetic field. If those particles are embedded in an elastic host material, the application of a magnetic field will also displace the host material surrounding the particles. Thus, as the particles displace or move in the direction of the magnetic field, the overall MR material will decrease in size, thereby thinning in response to the magnetic field.

The magnetic field source 206 generates a magnetic field and is controlled by the controller 209. The controller 209 may control the strength and the orientation of the generated magnetic field, to include the strength and orientation of the magnetic field as imparted to a key 104. The controller may be implemented in any number of ways, for example as or within a processor of a computing device, as a software component or module of the smart keyboard system 200, and the like. The controller may function to establish and maintain a unique input force response profile, as selected from multiple input force response profiles. More description of the processor of a smart keyboard system is provided with respect to FIG. 9.

The magnetic field source 206 may be any known to those skilled in the art. In one embodiment, the magnetic field 206 is created through use of electric currents, based on the well-known physics of creating a magnetic field from a wire carrying an electric current. Generally, the terms "electromagnet" or "electromagnetism" will be used to refer to generation and control of a magnetic field through electrical control. Electromagnets are one example of magnetic field sources that may be used to adjust properties of a magneto-rheological material.

In one embodiment, a magnetic field source is disposed adjacent the smart key, and is designed so as to not impart appreciable magnetic energy on adjacent keys. In one embodiment, the magnetic field source is configured to fit within or adjacent a magnetic shield, so to prevent or restrict magnetic field leakage to adjacent keys. In one embodiment, one or more electromagnets (or other magnetic field sources) are disposed on, within, or adjacent a key or node and are configured on opposing sides of a magneto-rheological material. When the one or more electromagnets are energized to produce a magnetic field, the magnetic field adjusts material properties of the magneto-rheological material, such as elasticity, stiffness, and any of length, width and height/thickness. By adjusting or varying the electromagnetic field, as produced by way of the electromagnets, the material properties of the magneto-rheological material may be controlled. The electromagnet may be configured as a component of the smart key, for example as a component adjacent a key cap, or as a separate component.

In one embodiment, a magnetic field source operates to manipulate or control more than one key of a group of keys or more than one input node of a group of input nodes. For example, a magnetic field source may operate to set a first group of keys to a first unique force response profile, and a second group of keys to a second unique force response profile, as defined by a user.

The controller 209 controls the magnetic field source 206 with respect to the magneto-rheological material 204. The controller 209 directs magnetic field parameters output by the magnetic field source 206 to establish desired parameters of the MR material 204, such as an input force response profile. For example, the controller 209 may direct the magnetic field source 206 to impart a primarily vertical magnetic field (passing, for example, primarily perpendicularly through the key cap) to the MR material 204 to cause a change in the stiffness of the MR material 204. Parameters of the magnetic field source 206 that may be controlled by the controller 209 include power level, directionality of magnetic field produced, and time duration of magnetic field emission, as well as other parameters known to those skilled in the art.

The controller may also control the response of the key 104 to a set of user-defined parameters or user-defined values. For example, a first user may prefer all keys 104 of a keyboard 102 be set to a relatively light touch, meaning a relatively low stiffness value. The first user may select a first value for the uniform stiffness of all keys 104, and store that preference as a first user-defined value within a larger user-defined unique input force response profile. The first user-defined unique input force response profile or preference profile may be stored by the device 100, the keyboard 102, etc. The controller may receive the first user-defined unique input response profile, in one embodiment from the electronic device 100, and proceed to control the keys 104 to the stiffness value designated in the first user-defined response profile. The user-defined response profile will establish the user-defined unique input force response profile of one or more keys of a group of keys or one or more nodes of a group of nodes.

In another example, a second user may prefer all letter keys be set to a first stiffness and a first damping value, and all remaining keys (e.g. space bar, numbers, etc.) be set to a second stiffness and a second damping. The user therefore defines a group of user-defined values for stiffness and damping, which define multiple input force response profiles.

Other user profiles for keys of a keyboard are possible, including per-key preferences for one or all of key stiffness, key damping, and key thickness (vertical height of a key.) For example, a user may provide or select a first user-defined value for stiffness for all keys associated with both left and right-hand index fingers, and a second user-defined value for stiffness for all other keys. In addition, a user may provide or select a third user-defined value for damping of all keys associated with the right hand, and a fourth user-defined value for damping for all keys associated with the left hand.

The controller may also monitor the performance of the keyboard generally and the keys individually to adapt the response profile of the individual keys and the keyboard generally. For example, the controller may identify that the left pinkie finger is steadily decreasing in input force. As a result, the controller may automatically decrease the stiffness of the keys used by the left hand pinkie finger, such that those keys are more sensitive to an input, thereby requiring less force by the left hand pinkie finger to engage its keys. Also, the controller may identify that the user has begun to type at a significantly higher speed than an earlier tranche of time, and therefore may prefer a "lighter touch" on the keyboard (translating to a decreased stiffness on all keys of the keyboard.)

The controller may also enable the smart key to automatically react to a minimal input force to the smart key or a breach of a threshold proximity distance to the smart key. Such operations will be described in detail below with respect to FIGS. 3A-C and FIGS. 6B-C.

Figure 3A:
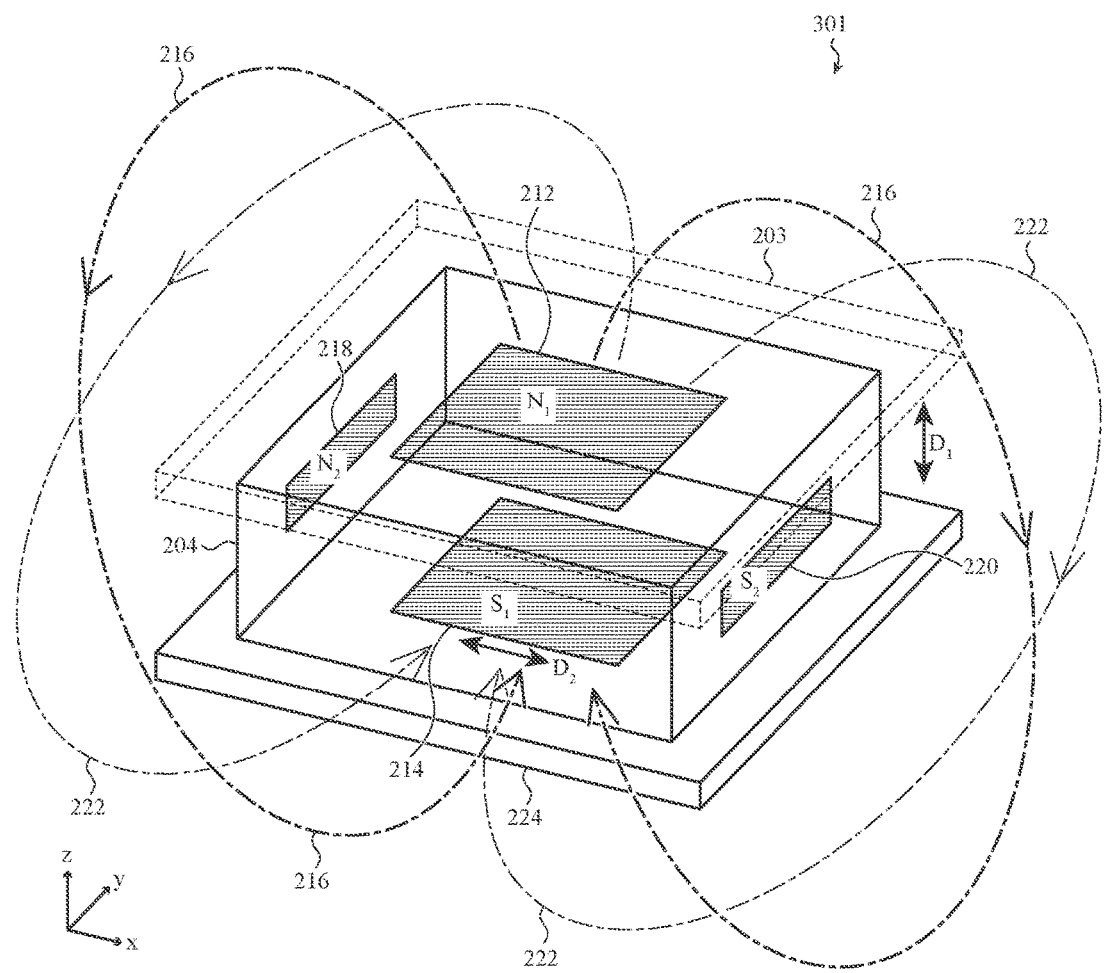
FIG. 3A is a sample view of one embodiment of a smart key 301 of the electronic device 100 of FIG. 1.

FIG. 3A illustrates an example smart key 301 of a smart keyboard system 200 according to various embodiments. The smart key 301 includes a magneto-rheological material 204 disposed below a key upper body 203 and above a key lower body 224. In some embodiments, the magneto-rheological material 204 may affix the key upper body 203 to the key lower body 224 or other substrate. The key upper body 203 includes an input surface configured to receive an input force. Two pairs of magnetic field sources, such as electromagnets, are disposed on or adjacent smart key 301 to enable control of material properties and/or geometries of the MR material 204. A first (vertical) pair of electromagnets N1 and S1 are disposed adjacent key upper body 203 and key lower body 224. A second (lateral) pair of electromagnets, N2 and S2, are disposed adjacent a first side and second side of smart key 301. The electromagnetic poles are passive unless activated by an energy source. Stated another way, the electromagnets do not operate unless excited by an energy source.

When one or both poles N1 and S1 are activated or energized by an energy source, a first magnetic field is generated, with magnetic field lines 216 flowing from pole N1 to pole S1. Generally, pole N1 and pole S1 are able to change the height or z dimension of the MR material 204 and thus provide controllability of dimension D1 to the smart key 301. The poles N1 and S1 may be disposed on flat plate electromagnetic structures 212, 214, respectively. The electromagnets may be powered by an electric current. Note that the directionality of the magnetic field lines 216 is readily reversed if the direction of the electric current flow is reversed. Other configurations of passive electromagnetic elements are possible. For example, an electrical coil may be fitted around or adjacent a key, such that a time-varying electrical current running through the coil produces a magnetic field. The MR material is thus subject to the magnetic field. Also, an electromagnet may be provided as a singular unit and thus not as a paired unit.

Similarly, when the second electromagnetic pair N2 and S2 are activated or energized, a second magnetic field is generated, with magnetic field lines 222 flowing from pole N2 to pole S2. Generally, pole N2 and pole S2 are able to change the width or y dimension of the MR material 204 subject to the field, and thus provide controllability of dimension D2 to the smart key 301. The respective pole N1 and pole S1 may be disposed on flat plate electromagnetic structures 218, 220, respectively.

Other configurations of the smart key 301 are possible. For example, the second or lateral pair of electromagnetic structures 218, 220 may be disposed on or adjacent the two sides of the key 104 devoid of electromagnetic poles in FIG. 3A. Stated another way, the second pair of electromagnetic poles may be disposed on or adjacent the sides of the MR material 204 oriented at 90 degrees from the electromagnetic structures 218 and 220 (e.g., non-opposing sides). In one configuration, electromagnetic poles are mounted on or adjacent all four sides of the MR material 204. Also, the electromagnetic poles or electromagnetic structures may be disposed on a surface of the MR material 204 in other geometries than the flat plate shown. For example, the electromagnetic poles or electromagnetic structures may be disposed on a circular plate. The electromagnetic poles or electromagnetic structures may also be disposed directly on or adjacent a key. Also, an electromagnetic pole may cover all or only a portion of the mounting plate. In other embodiments, the electromagnetic poles are directly attached to the MR material and no mounting plates are required.

In one embodiment, one or more electromagnetic poles are not in physical contact with a key surface, and instead are positioned adjacent the key. In other embodiments, one or more electromagnetic poles are embedded within the key. For example, one or more electromagnetic poles are contained within the MR material. In one embodiment, the one or more electromagnets In the embodiment of FIG. 3A, the electromagnetic pairs are generally disposed parallel to a surface of the MR material 204. In some embodiments, one or more electromagnetic pairs, or one or more electromagnetic poles, are disposed transverse to a surface of the MR material 204.

Figure 3B:
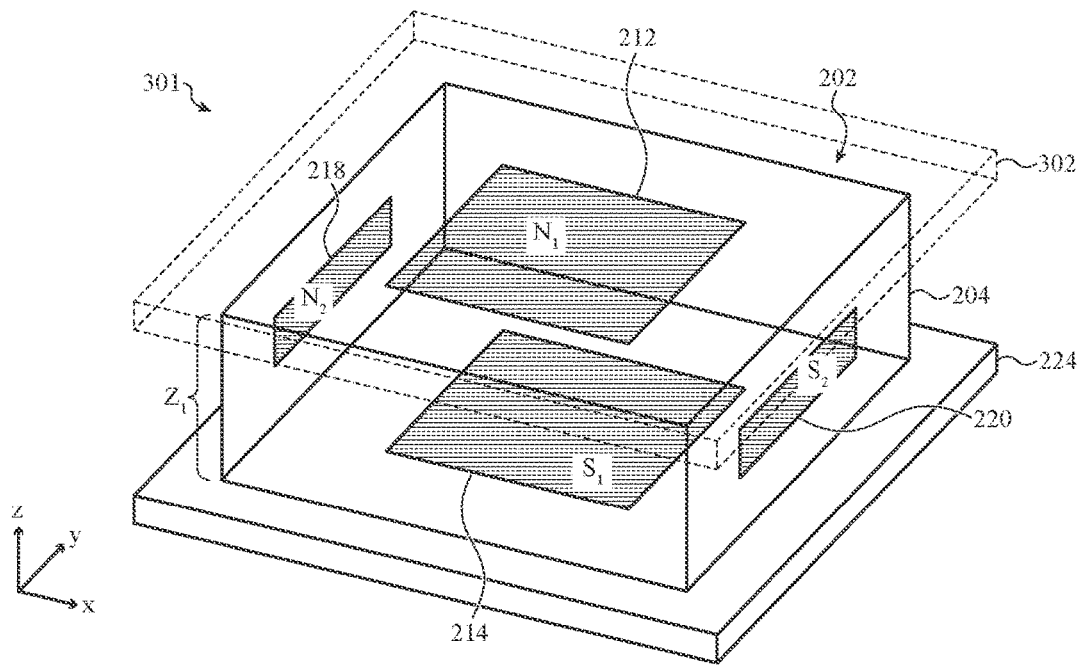
FIG. 3B is a sample view of the embodiment of the smart key 301 of FIG. 3A in an undepressed state.
Figure 3C:
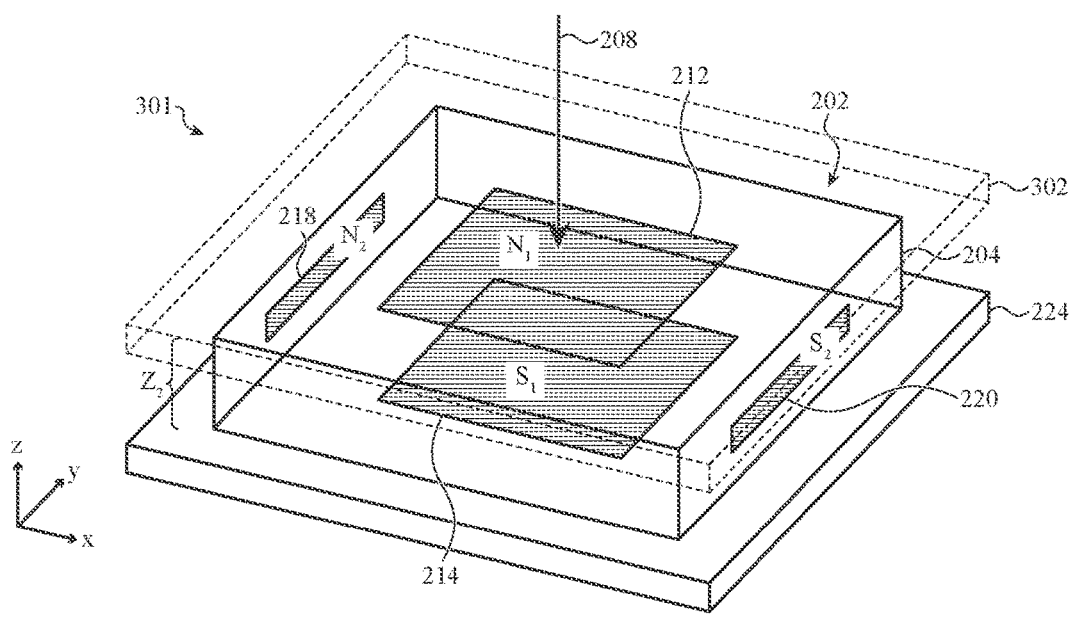
FIG. 3C is a sample view of the embodiment of the smart key 301 of FIG. 3A in a depressed state.

FIGS. 3B-3C illustrate the example smart key 301 of a smart keyboard system 200 of the embodiment of FIG. 3A in a respective undepressed state and a depressed state. FIG. 3B depicts the smart key in a first undepressed state in which no input force (e.g. no input force from a user) is imparted to the smart key 301. FIG. 3C depicts a second depressed state of the smart key 301 in which an input force 208 is imparted to the smart key 301.

With attention to FIG. 3B, the magneto-rheological material, such as a magneto-rheological elastomer, of the smart key 301 has a height Z1 in the undepressed state. The undepressed or resting state may also block any magnetic field from magnetic field source 206. Such a configuration of the smart keyboard system 201 may result from the magnetic field source 206 not emitting any energy to excite the electromagnetic poles of the smart key 301 sufficiently to change the height Z1, or the magnetic field present is oriented such that the directionality of the magnetic field does not influence the height Z1. For example, the magnetic field source 206 may be emitting magnetic energy, but the energy is below a threshold level of energy that triggers deformation of the MR material 204 in the vertical Z direction. In another example, the electromagnetic structures may be producing a magnetic field but the resulting magnetic field lines are such that no deformation of the MR material in the vertical Z direction occurs.

Alternatively, the undepressed state shown in FIG. 3B may result from an initialization state in which an initialization magnetic field from magnetic field source 206 is imparted to the smart key 301. Such a situation may occur when a user prefers a lower physical profile of the keys of the keyboard than a nominal resting state presents. For example, a user may prefer that the keys all sit parallel to a plane of the keyboard, a profile different than the nominal resting state discussed above. Such a configuration of keys would require an active magnetic field to deform the MR material 204 to the reduced Z height sought by the user.

With attention to FIG. 3C, the smart key 301 has a height of MR material Z2 in the depressed state depicted, where Z2 is less than Z1. The depressed state is triggered by an input force 208 to the input surface of the smart key 301. As a result of the input force 208 imparted to the input surface, the magnetic field source 206, as controlled by controller 209, emits a magnetic field that deforms the MR material 204 in a manner than reduces the MR material 204 height from Z1 to Z2. The depressed state of FIG. 3C may be obtained through operation of solely one pair of electromagnetic poles, e.g. 212, 214, or a multitude of electromagnetic pairs, e.g. to also operate electromagnetic poles 218, 220.

Although FIGS. 3A-C have focused on changes to the shape of the MR material 204 as a result of the application of a magnetic field from magnetic field source 206, the MR material 204 may also experience a change in mechanical moduli as a result of the application of a magnetic field. For example, one or more of the stiffness, damping and elasticity of the MR material 204 may change between the undepressed state of smart key 301 in FIG. 3B and the depressed state of smart key 301 in FIG. 3C.

Continuing with reference to FIGS. 3B-3C, the controller 209 may be configured to initialize the magnetic material 204 to a set of mechanical moduli and then maintain that set of mechanical moduli during smart key operation. For example, a user may select a desired elasticity and stiffness for the smart keyboard by way of a set of user defined parameters, as described above, to define a unique input force response profile. The controller 209 may initialize the smart key 301 to that set of elasticity and stiffness in concert with the setting of the nominal undepressed height Z1 of the smart key (as shown in FIG. 3B.) The controller 209 so initializes the smart key 301 to the initial deformation and moduli by control of magnetic field source 206. The controller 209 may also be configured to maintain the initial elasticity and stiffness throughout operation of the smart key 301, to include during transition to and when operating at the depressed state of smart key 301 shown in FIG. 3C. In such a configuration, the feel of the smart key 301 response will match that of a conventional mechanical spring and damper system of identical elasticity and stiffness.

It may be desirable to contain the MR material 204 within the volume defined by the key upper body 302 and key lower body 224. For example, an MR material 204 not so contained may stretch into an adjacent key volume and impact or degrade adjacent key performance. To maintain a consistent MR material 204 contact surface area with the key upper body 302 and key lower body 224, or at least contain the MR material 204 within a key's volume, more than one pair of electromagnetic poles may be employed. In the change from height Z1 of FIG. 3B to the height Z2 of FIG. 3C, the x-y dimensions of the MR material 204 are consistent and unchanged. Some MR materials 204 deform in such a manner wherein one dimension may be adjusted without substantial deformation in either of the remaining two dimensions (here, a change in Z dimension without change in x or y dimension.) Other MR materials 204 exhibit coupled deformation, meaning that a deformation in one direction results in deformation in at least one other dimension. The controller 209 may control the magnetic field source 206 so as to maintain the MR material 204 to desired boundaries, either to maintain a consistent contact surface area (as shown in FIGS. 3B-C) or to restrict the MR material to the volume defined by the key upper body 302 and key lower body 224.

The smart key 301 may be configured to operate in response to an input force 208 to the input surface which is of negligible magnitude or to the near proximity of a user. Such an operational mode may be enabled by any of several types of sensors located on or adjacent the input surface of key upper body 302. For example, when an object, e.g. a user finger, approaches the key upper body 302 (and associated input surface), the object may capacitively couple to a capacitive sensor or other structure. As a result, the change in capacitance at the sensor is detected. The change in capacitance may be interpreted as a finger being proximate to the key upper body 302 or to the key input surface. The controller may establish a baseline capacitance when there are no objects proximate to the resistor and can be compared to the capacitance when an object is proximate in order to determine the change. Any of several known types of proximity sensors may additionally or alternatively be used to trigger operation of the smart key 301. Sample proximity sensors include capacitive sensors, optical sensors, Hall Effect sensors, ultrasonic sensors, and so on. In some embodiments, the proximity sensor may be a touch sensor.

When the smart key 301 is configured to operate with minimal to zero input force 208, the smart key 301 depresses in the same manner described above. However, the movement of the smart key 301 is triggered by a proximity sensor in the case of zero input force, or a touch sensor in the case of a minimal input force. To provide an indication to the user that the smart key 301 is operating, any of several types of haptic feedback may be used. For example, the smart key 301 may subtly vibrate or provide a visual cue such as a light.

When the smart key 301 is implemented with a proximity sensor proximal or adjacent the input surface, the smart key 301 may automatically depress with minimal (or even no) user input force. That is, a smart input device may move in a direction in which an input force is exerted, or an object is traveling toward the smart input device, even if the smart input device is not yet touched or is lightly touched.

For example, as a finger approaches an input surface of a key, the proximity sensor associated with the key is tripped, and the key depresses, providing a key input without actual user finger force input to the input surface. The proximity sensor may also be adjusted in sensitivity so as to require a nominal force input. More description of force input profiles for a smart key implemented with a proximity sensor is provided with respect to FIGS. 6B-6C. The proximity sensor may be configured as a component of the smart key, such as a component of the key cap, or as a separate component.

Figure 4A:
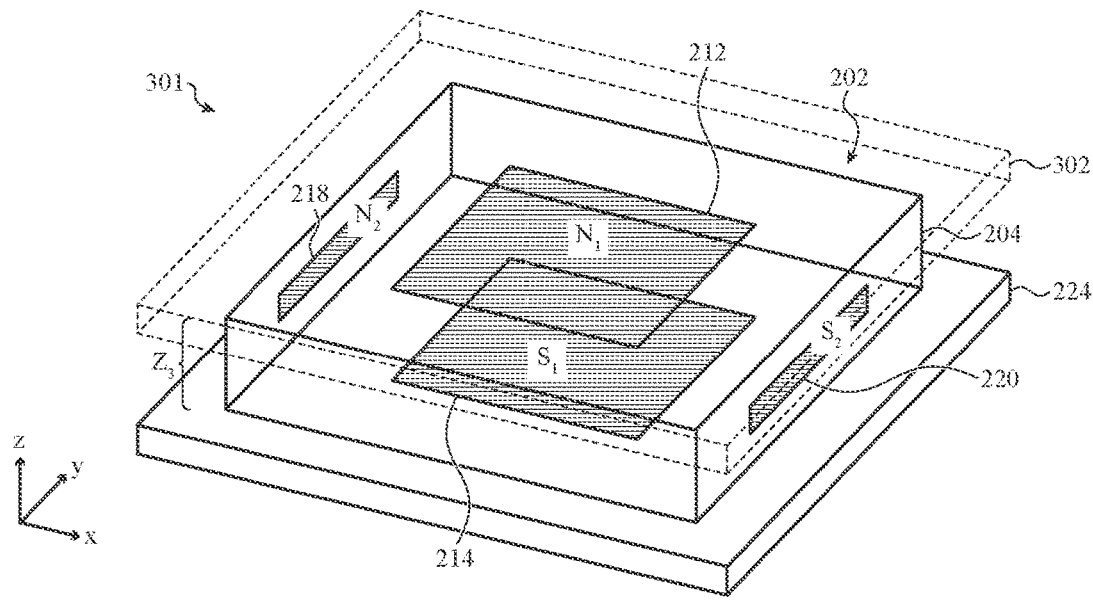
FIG. 4A is a sample view of another embodiment of a smart key 401 of the electronic device 100 of FIG. 1 in a depressed state.
Figure 4B:
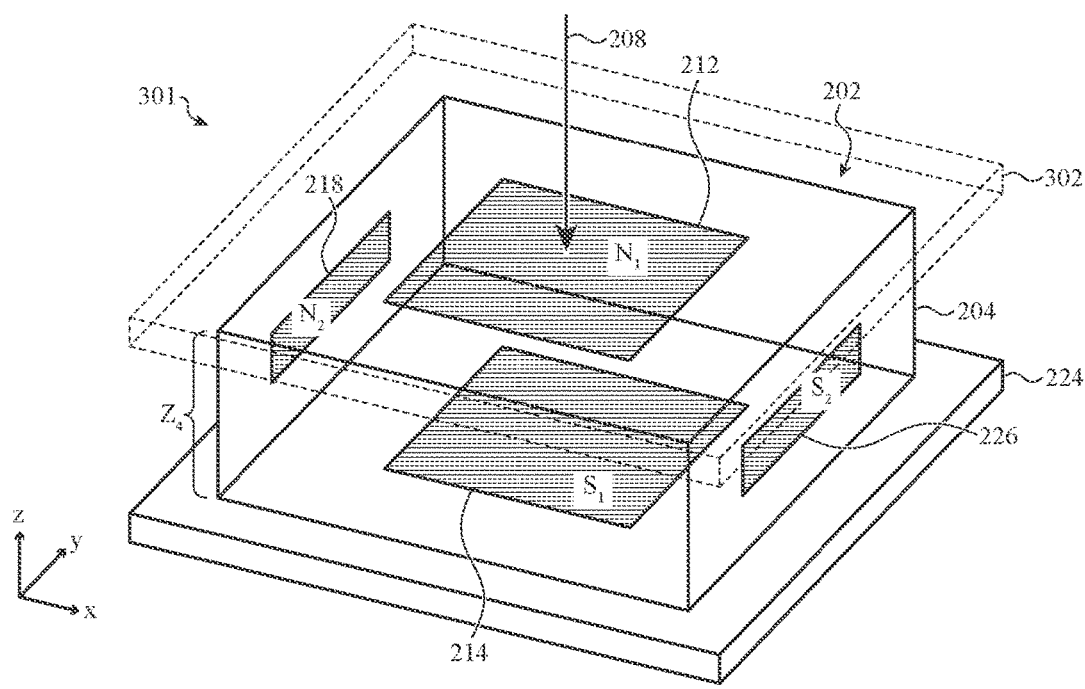
FIG. 4B is a sample view of the embodiment of the smart key 401 of FIG. 4A in an undepressed state

FIGS. 4A-4B illustrate the example smart key 301 of a smart keyboard system 200 of the embodiment of FIG. 3A in a respective depressed state and an undepressed state. FIG. 4A depicts the smart key in a first depressed state in which no input force (e.g. no input force from a user) is imparted to the smart key 301. FIG. 4B depicts a second undepressed state of the smart key 301 in which an input force 208 is imparted to the smart key 301.

Generally, the embodiment of the smart key 301 in FIGS. 4A-4B is similar to the embodiment of FIGS. 3A-3B except that the initialization state of the smart key and the reaction of the smart key to an input force are different. With attention to FIG. 4A, the smart key 301 has a height of MR material Z3 in the undepressed state depicted. The controller 209 initializes the smart key 301 to a user selectable nominal height, as determined by the height Z3 of MR material 204. The controller 209 also configures the MR material 204 to a selectable set of mechanical moduli, such as stiffness and/or damping. Upon receipt of an input force 208 to the input surface, the smart key 301 expands to a height Z4, as shown in FIG. 4B. Thus, in the configuration of FIGS.

4A-4B, the smart key 301 reacts to an input force 208 imparted to the input surface by expanding the height of the MR material 204 rather than reducing the height of the MR material (as provided in the embodiment of FIGS. 3A-3B). Other coupling of MR material shape changes with input force are possible, to include expanding or contracting one or both lateral dimensions x, y with a vertical input force.

Figure 5A:
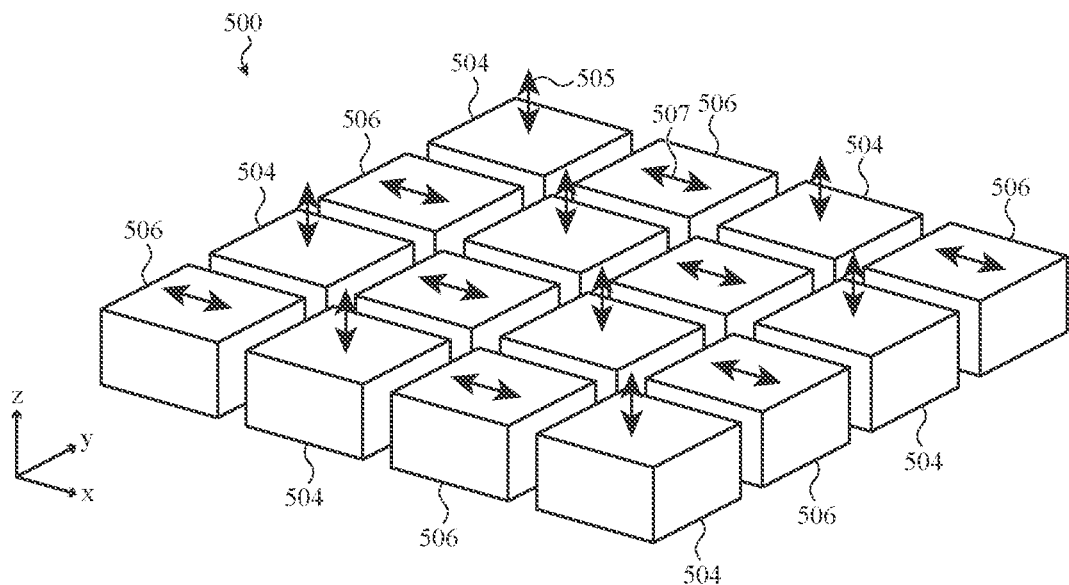
FIG. 5A is a sample view of a portion of another embodiment of a smart key 501 of the electronic device 100 of FIG. 1, the smart key 501 with a matrix of MR materials.
Figure 5B:
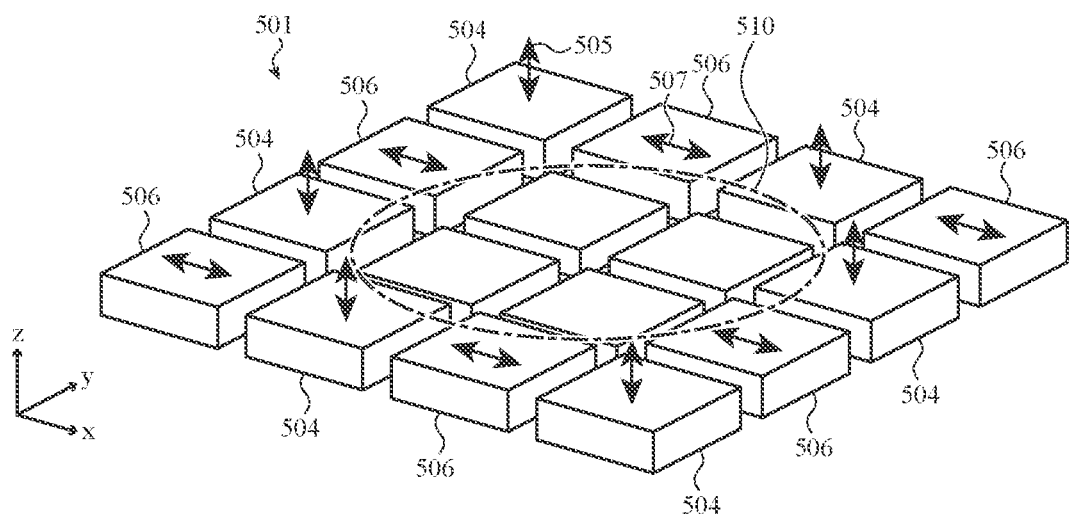
FIG. 5B is a sample view of a portion of yet another embodiment of a smart key 501 of the electronic device 100 of FIG. 1, the smart key 501 with a matrix of MR materials.

FIGS. 5A-5B illustrate a smart key 501 configured with a matrix of MR materials, the MR materials 504, 506 specialized for adjustment of mechanical moduli or for deforming at least in a vertical direction. Each of the MR materials may correspond to a unique input surface, or multiple MR materials may correspond to a single input surface. Although the embodiment of FIGS. 5A-5B is depicted with a matrix of MR materials, a matrix of any variable response material may also be used. Such a matrix may be used in order to provide localized feedback and/or local control over the response of an input surface; this may be especially useful when the input surface is relatively large, such as when the input surface is a surface of a trackpad.

With attention to FIG. 5A, a four by four element matrix of MR materials 204 is depicted. The elements alternate between a first MR material type 506 and a second MR material type 504. The matrix of MR materials are disposed below a key upper body 202 and above key lower body 224, similar to the arrangement of FIG. 3A. However, in contrast to the embodiment of FIG. 3A, a matrix of MR materials is substituted for the single MR material 204 of FIG. 3A. The individual MR material matrix elements may be disposed adjacent to one another. For example, the adjacent edges of the MR material elements may align and/or make contact with one another. In one embodiment, all internal edges of the MR material elements are disposed adjacent to one another.

The first MR material type 506 is specialized for adjustment of damping 507 (depicted as a horizontal double arrow on the MR material surface), and the second MR material type 504 is specialized for adjustment of stiffness 505 (shown as a double vertical arrow perpendicular to the MR material surface.) The use of a matrix of MR materials 204 provides several functionalities, including increased controllability of the smart key 501 response profile, varying response at different locations of the smart key 501, increased reliability and robustness, and intra-key deformation of the smart key 501 (or trackpad, or other input device).

A matrix of MR materials specialized for a particular mechanical modulus increases the overall controllability of the smart key 501 response profile. A given MR material will exhibit different sensitivities or responses to different mechanical moduli. For example, a first MR material may require a relatively stronger magnetic field to cause a given change in stiffness than a second MR material. Thus, the second MR material affords a wider range of stiffness controllability for a given magnetic field range, and is a better MR material to control stiffness than the first MR material. However, the second MR material may require a relatively stronger magnetic field to cause a given change in damping for a given magnetic field range, and thus the first MR material is a better MR material to use to control damping. Therefore, a system which uses the second material (e.g. second MR material 504) to control stiffness and the first material (e.g. first MR material 506) to control damping affords a wider range of operational control than if only one of the materials was used. Stated another way, the use of a matrix of the two MR materials enables stiffness to be adjusted to a larger range of values, and damping to be adjusted to a larger range of values. Thus, the number and range of unique input force response profiles which define multiple input force response profiles is increased.

The use of a matrix of MR materials also increases the reliability of the smart key over use of one MR material due to redundancy in the MR material. In the event the sole MR material contained as one MR material portion fails, the smart key would no longer function. However, the embodiment of the smart key includes a matrix of MR materials does not exhibit such a single point of failure. In the event one of the matrixes of MR material elements fails in the embodiment of FIGS. 5A-5B, the remaining MR material elements would continue to function, therefore not causing failure of the smart key. Furthermore, in such a scenario, the controller 209 would adapt to the changed level of controllability, and may be able to reconfigure the remaining operating MR materials to perform the operations of the failed MR material element.

A matrix of MR materials may also allow intra-key deformation of the smart key 501, as depicted in FIG. 5B. In addition to enabling specialization of mechanical moduli, a matrix of MR materials 204 enables non-uniform deformation of the smart key 501. With attention to FIG. 5B, a 16 element matrix of MR materials is depicted, similar to the embodiment of FIG. 5A. However, three types of MR materials are employed. Similar to the embodiment of FIG. 5A, the first MR material type 506 is specialized for adjustment of damping 507, and the second MR material type 504 is specialized for adjustment of stiffness 505. However, a third MR material type 510, disposed in the central 4 elements, exhibits a different vertical deformation response than the first MR material type 506 and the second MR material type 504. More specifically, the third MR material type is relatively more responsive to vertical deformation for a given magnetic field input, and therefore vertically deforms more than the surrounding elements. The result is a locally deformed portion in the central portion of the smart key, thus providing a smart key surface contoured to a user finger, for example.

Although the above description focused on the use of a single magnetic field source, such that varied responses result in the different MR material types, one or more of the MR material types may be instead controlled by an additional magnetic field source. For example, with regard to the embodiment of FIG. 5A, the first MR material type 506 could be controlled from a first magnetic field source and the second MR material type 504 could be controlled from a second magnetic field source. Other combinations of magnetic field source and MR material types are possible. For example, one or more pairs of a first type of electromagnet may be disposed on or adjacent opposite sides of a first MR material, the pair of electromagnets energized to produce a magnetic field which in turn adjusts properties of the first MR material. Similarly, a one or more pairs of a second type of electromagnet may be disposed on or adjacent opposite sides of a second MR material, the pair of electromagnets energized to produce a magnetic field which in turn adjusts properties of the second MR material. However, the use of two types of electromagnetics allows an additional degree of control of the two MR materials making up the matrix of MR materials.

Figure 6A:
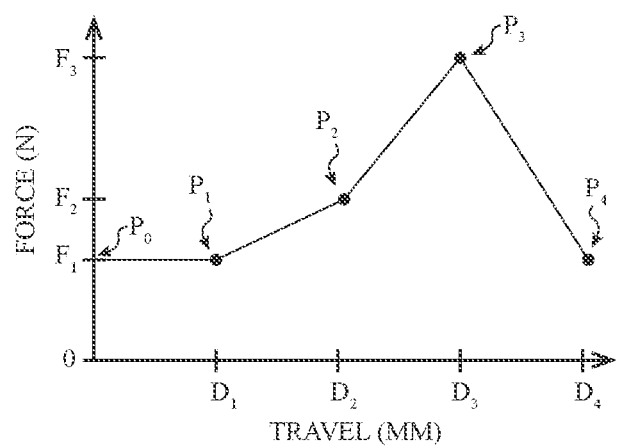
FIG. 6A illustrates a sample force vs. travel graph showing key response to a user force input for a mechanical response keyboard.
Figure 6B:
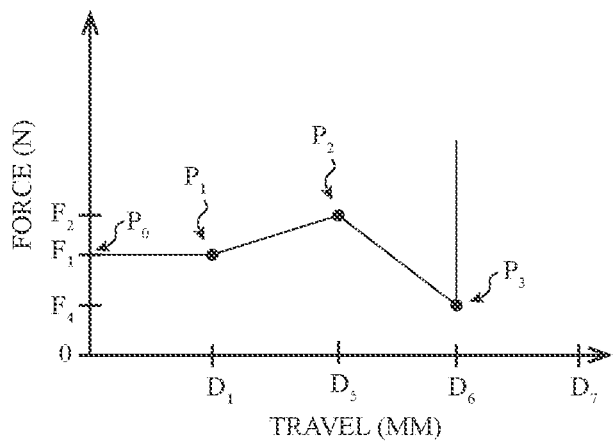
FIG. 6B illustrates a sample force vs. travel graph showing one embodiment of a smart key response to a user force input for a smart keyboard feature.
Figure 6C:
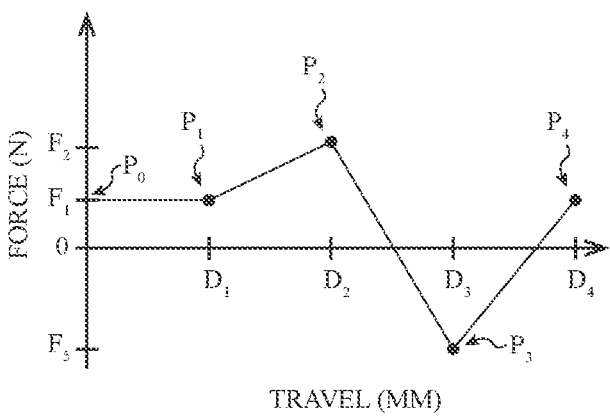
FIG. 6C illustrates a sample force vs. travel graph showing another embodiment of a smart key response to a user force input for a smart keyboard feature.

FIGS. 6A-6C illustrate sample graphs of key travel in response to a key input force (e.g., force/travel patterns). Generally, each graph shows four phases of key travel in response to an input force. The graphs each show a unique input force response profile, thereby defining the travel response of a key to an input force imparted to a key. The use of variable response materials, such as MR materials, allows an input surface to have multiple input force response profiles and to apply different input force response profiles at different times. Stated another way, a unique input force response profile may be defined or chosen from multiple possible input force response profiles; the variance or adjustment in a material property of an MR material due to a magnetic field may vary a corresponding input surface's input force response profile. Travel is notionally in millimeters and force in Newtons.

For each of the graphs, the first phase begins at point $P_0$ and travel $D_0$, and ends at travel $D_1$. The first phase is a resting or free state of the key, meaning no input has been provided by a user to the key. A force may be present in the first phase representing a preload on the key or no force may be present (e.g., the initial point of the graph represents zero force). Note that, although the phases of force-travel are depicted with discontinuous inflection points, the transition between phases may occur with smooth continuous transition points.

Initially, a sample force/travel pattern shown in FIG. 6A will be discussed. As a key is depressed, key travel (shown as millimeters of displacement) increases. Generally, an input surface does not travel until subject to a sufficient force. Thus, for example, an input force may need to reach a threshold force $F_1$ in order to displace the input surface; the zero-travel point of the input surface is represented by point $P_0$.

As input force increases from $F_1$ to $F_2$, key travel increases from distance $D_1$ to distance $D_2$. Thus, the force/travel pattern slopes upward and to the right from point $P_1$ to point $P_2$. Put another way, increasing input force increases key travel. Likewise, increasing input force from $F_2$ to $F_3$ increases key travel distance from $D_2$ to $D3$, as represented by point $P_3$.

Once point P3 is reached on the force/travel pattern of FIG. 6A, the magnetic field source may be activated in order to vary a response of the input surface by adjusting a material property of a corresponding magneto-rheological material. The stiffness and/or elasticity of the magneto-rheological material may be adjusted to cause the input surface to travel further under less force. Accordingly, as force decreases, the input surface may continue to travel. This is represented by the portion of the pattern sloping downward and right from $P_3$ to $P_4$.

FIG. 6B depicts an alternative example input force response profile of a smart input surface. Generally, the force/travel pattern is the same through point $P_2$ (representing an input force $F_2$ causing the input surface to travel a distance $D_2$). One point $P_2$ is reached, the properties of the magneto-rheological material may be varied to cause the key to travel further in response to a weaker input force, thereby permitting the input surface to travel distance $D_3$ even though the input force has been lowered from $F_2$ to $F_4$.

However, in the example of FIG. 6B, the magnetic field may again be adjusted to greatly stiffen the magneto-rheological material once point $P_5$ is reached, thereby ensuring the input surface does not travel further, even if input force is greatly increased. This may correspond to, or otherwise mimic, the "bottoming out" of a typical key, button, or other input device.

FIG. 6C illustrates yet another sample input force response profile with another unique force/travel pattern. Here, once point $P_2$ is reached, a height of the magneto-rheological material may be adjusted to cause the input surface to retract, essentially causing the input surface to travel a distance D3 even though no force (or negative force) is applied. The "negative force" in this example is caused by the magneto-rheological material retracting under the effect of the magnetic field; the input surface will thus move even if the input force is removed. This retraction may be caused by the input surface moving in a direction in which an object is moving toward the input surface.

It should be noted that although the input force response profile of a smart key has been discussed with respect to key cap travel as a function of key input force, other kinematic representations are possible. For example, a key cap's travel with respect to a given key reaction force (e.g., a force that resists an input force) may be used to describe the smart key kinematics. Such a reaction force may be adjusted by varying a stiffness (elasticity) of the MR material, as one example. In such a representation, the motion or kinematics of a smart key may still be varied through control of a variable force material.

Figure 7:
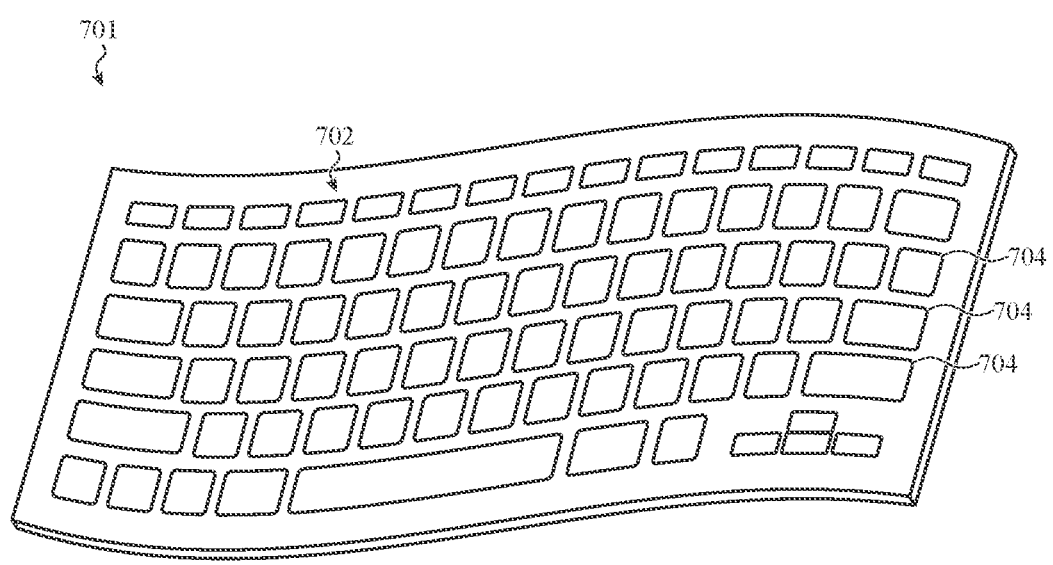
FIG. 7 illustrates another embodiment of the smart keyboard system 701 as a sheet keyboard.

FIG. 7 illustrates another embodiment of the smart keyboard system 701 as a sheet keyboard 702 including smart keys 704. Other components of the smart keyboard system 701 (e.g. controller 209, magnetic field source 206) are not shown.

Because the smart keys 704 do not require traditional mechanical devices beneath the keys, the sheet keyboard 702 may be thin and flexible. For example, traditional keyboards may require a spring beneath each key, the spring requiring a minimal extension dimension to adequately provide a return or response force to the key. In contrast, the variable response material used to enable the smart key 704 requires relatively minimal vertical dimension to provide an adequate response force to the key, thereby allowing a much thinner keyboard.

Furthermore, traditional keyboards requirement rigid encasements to engage or mount traditional mechanical devices disposed beneath each key. In contrast, the configuration of the smart key 704 and properties of the MR material allow a flexible keyboard. For example, the MR material, as implemented as a magneto-rheological elastomer, provides a flexible shape, and may be attached (e.g. glued) to conform to the shape or orientation of the key surface. The magneto-rheological elastomer does not require the rigid encasements or attachments of traditional keyboards. Also, the physical relationship between the magnetic field source(s) and each individual key may be monitored and calibrated by the controller 209. A key/MR material component that has been adjusted in orientation and/or location may be so identified by the controller, which can appropriately adjust the operation of the magnetic field to account for the key/MR material movement.

In one embodiment of the smart keyboard system 701, one or more pairs of electromagnets are fitted on opposing sides of an MR material, the MR material disposed below or adjacent a key cap of the group of keys 704, the MR material being a magneto-rheological elastomer. A particular pair of electromagnets is energized by an energy source, such as by a battery providing electrical power. The energized electromagnets produce a magnetic field that, when imparted to the magneto-rheological elastomer, adjusts properties of the magneto-rheological elastomer, such as elasticity, stiffness, and/or physical shape. Thus, the material properties of the magneto-rheological elastomer may be controlled by adjusting or varying the electromagnetic field, as produced by the electromagnets. Similar to earlier embodiments, one or more smart keys 704 may be configured with a unique input force response profile, and may be user-defined from multiple input force response profiles.

Figure 8:
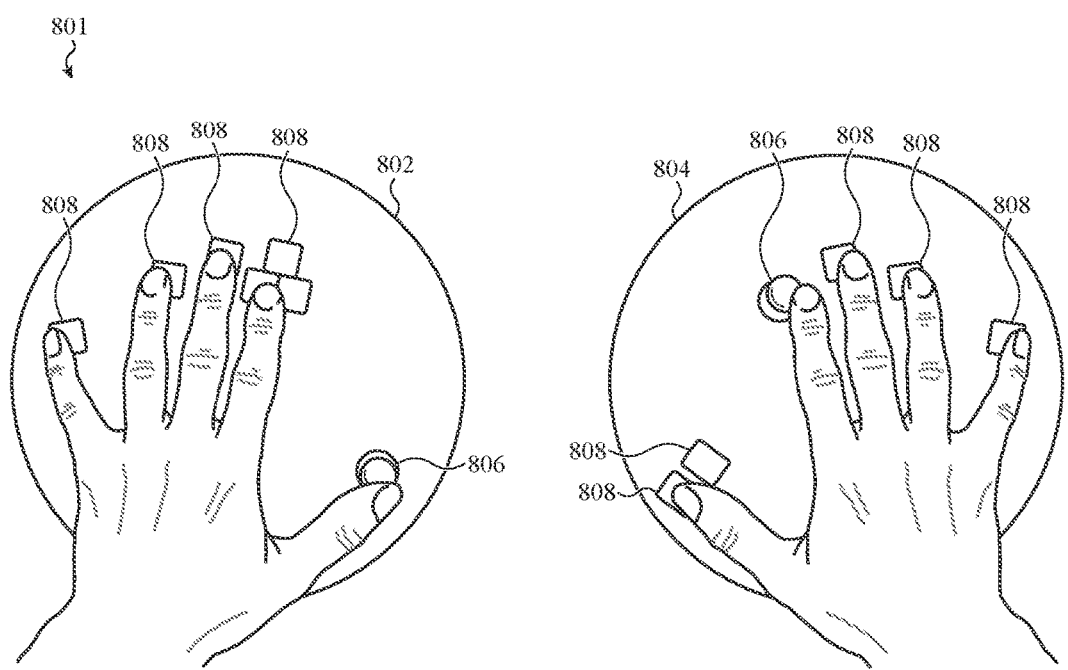
FIG. 8 illustrates another embodiment of the smart keyboard system 801 as a pair of spherical input devices.

FIG. 8 illustrates yet another embodiment of the smart keyboard system 801 as a pair of spherical or hand-held input devices 802, 804 including groups of input nodes 806 and 808. The input nodes may be configured as smart keys 808 and smart joystick keys 806. Other components of the smart keyboard system 801 (e.g. controller 209, magnetic field source 206) are not shown.

As discussed with regard to the embodiment of FIG. 7, the smart input nodes do not require traditional mechanical devices beneath the nodes. As such, alternative physical configurations for the nodes may be provided, such as the pair of spherical input devices 802, 804 of FIG. 8. Each of the spheres 802, 804 present input nodes configured as smart keys 808 associated with one hand, not unlike traditional split-hand keyboards. A smart joystick key 806 is also depicted on each sphere 802, 804. In the embodiment of FIG. 8, one or more smart keys 808 are positioned on the respective surface of each spherical keyboard 802, 804 for engagement by the left and right hand, respectively. For example, a set of three smart keys 808, disposed on the left sphere 802, are associated with the index finger of a user's left hand. Similarly, a set of two smart keys 808, disposed on the right sphere 804, are associated with the thumb of a user's right hand. A smart joystick 806 is disposed on the sphere 802 for operation by the thumb of a user's left hand. A smart joystick 806 is disposed on the right sphere 804 for operation by the index finger of a user's right hand. Other shapes of the sphere 802, 804 other than a sphere are possible, such as a block, saucer, cylinder, contoured shape, or other hand-held (or non-hand-held) shape.

Each of the input nodes of the spherical input devices 802, 804 may function similarly as described above in previous embodiments. For example, the group of input nodes may be adaptable or variable to user preferences for input response, such as stiffness and damping characteristics, through use of variable response materials such as MR materials and controlled magnetic fields. Thus, one or more of the group of input nodes may be configured to operate with a particular node force response profile. One or more smart input nodes may be configured with a unique input force response profile, and may be user-defined from multiple input force response profiles. Each node force response profile will define the operation and/or physical deformation of each respective input node.

The smart joystick keys 806 of the spherical input devices 802, 804 similarly employ MR material and controlled magnetic fields. However, the smart joystick key 806, in addition to displacing in a vertical direction, also hinges from a base point and rotates about the base point. Thus, the smart joystick key 806 operates with two additional degrees of freedom than the smart keys—a rotational degree of freedom about a central hinge axis and an angular degree of freedom from a nominal vertical position. The kinematics or motion of each of the rotational and angular degree of freedom of the smart joystick key 806 may be controlled though MR materials in a similar manner to that used for the smart keys 808. Each joystick key may be configured to operate with a particular node force response profile. Other configurations of smart input devices are possible other than keys and joysticks, such as a smart trackpad, smart four-way controller pad, and so on.

The smart joystick 806 may be fitted with one or more MR materials in, on or adjacent the hinge point of the joystick arm and the joystick base. The MR materials may be configured to govern the material moduli of the smart joystick 806 input node in both the joystick rotational motion and angular motion. For example, a first array of a first MR material may form a ring around the joystick arm, the first array configured to vary the stiffness of the joystick arm with joystick travel from a vertical orientation or default position. The first MR material of the first array may be controlled through a magnetic field to change or vary in stiffness, the stiffness selectable by a user. In such a manner, a less-stiff or looser joystick may be provided to a first user, and a more rigid or stiffer joystick may be provided to a second user. In one embodiment, pairs of electromagnets are employed to adjust and control a material property of a targeted MR material. The pairs of electromagnets are energized to impart a magnetic field to the MR material, thereby changing material properties of the MR material. Thus, the operation of the input node, as defined by, for example, the node force response profile, may be controlled.

The spherical input devices 802, 804 may be configured to operate with most or all components housed within the respective spheres. For example, each sphere may contain a magnetic field source and controller which activates and controls the magnetic field source, thereby adjusting properties of MR materials associated with each of the smart keys 808 and smart joysticks 806. For example, a controller and a battery may be contained within each sphere, the controller and battery configured to engage the MR materials disposed on or adjacent the smart keys and smart joysticks. Also, each spherical input device 802, 804 may be configured with a wireless communication element to allow the smart key or smart joystick input to be transmitted to a host device, such as a gaming console. Furthermore, one or more pairs of electromagnets of one or more input nodes of a group of input nodes may be contained within a sphere.

The spherical input devices 802, 804 may further be configured to operate in a non-resting or non-static state. For example, each of the user's hands may be fitted with a device, such as a glove, which allows attachment of the user's hands with each of the spheres. In such a configuration, a user may lift up one or both spheres and still provide input to the smart keys and smart joystick.

Also, in one embodiment, a sphere may be configured with an orientation sensor, such as a tilt switch, an accelerometer, Hall Effect sensor, GPS sensor or inertial reference unit. The orientation sensor may allow adjustment or control of the smart key or smart joystick properties to vary with sphere orientation. For example, the stiffness or damping of the joystick may operate with a first set of values when the sphere is oriented in an upright posture, and with a second set of values wen the sphere is oriented in a downward posture.

Figure 9:
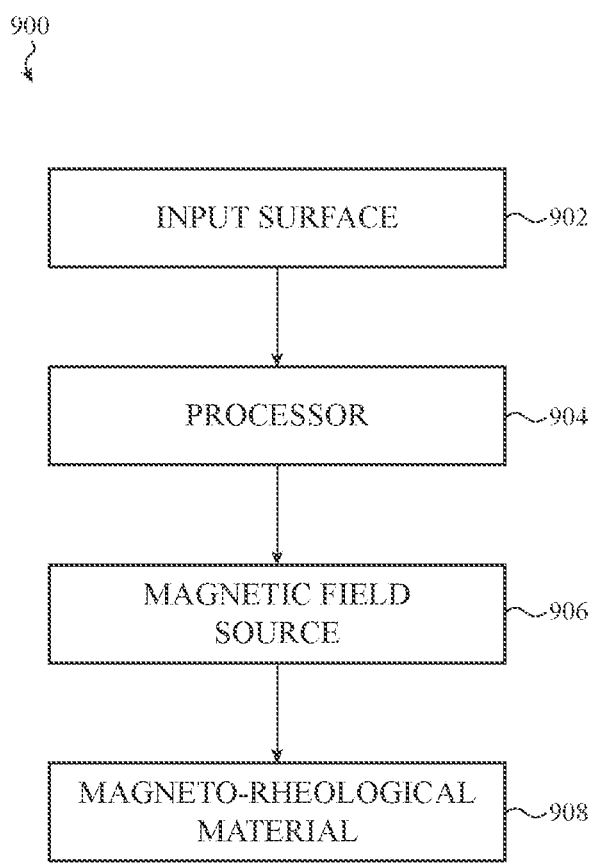
FIG. 9 is a sample block diagram of a smart keyboard 901 and associated electronic components.

FIG. 9 illustrates an example smart keyboard system 900 according to various embodiments. The smart keyboard system 900 includes an input surface 902 including a touch sensor, a processor 904 including a controller, a magnetic field source 906, and a magneto-rheological (MR) material 908 such as a magneto-rheological elastomer. A user applies an input to the input surface 902. The presence of the user input is identified by the touch sensor which in turn sends a signal to the processor 904.

The processor 904 determines the appropriate response profile for the identified input. For example, for a smart keyboard system 900 similar to the embodiment of FIGS. 3B-3C, the processor will determine that the smart key should automatically depress downward. Also, the processor will determine the stiffness and damping of the response, as selected by the user. Once the processor has determined the desired response profile, the processor will determine the instructions to provide the magnetic field source 906 to cause the appropriate response by the MR material 908. The processor 904 then transmits the instructions to the magnetic field source 906, which emits a magnetic field directed to the MR material 908. The MR material 908 then configures (e.g. deforms in the vertical direction, and adjusts mechanical moduli as required) to provide the desired response.

The foregoing description, for purposes of explanation, used specific nomenclature to provide a thorough understanding of the described embodiments. However, it will be apparent to one skilled in the art that the specific details are not required in order to practice the described embodiments. Likewise, certain features, functions, structures and the like may change from embodiment to embodiment. As one non-limiting example, a controlled and contained volume of ferrofluid may be used in some embodiments in place of an MR material, or other substance that varies a material property in response to a magnetic field. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An input device configured to receive an input force, the input device comprising:
   an input surface;
   a variable response material adjacent the input surface;
   a magnetic field source adjacent the variable response material and positioned between the input surface and the variable response material; and
   a controller configured to control the magnetic field source;
   wherein the magnetic field source is configured to generate a magnetic field to adjust one or more material properties of the variable response material, thereby varying a response of the input surface to the input force.

2. The input device of claim 1, wherein the variable response material is a magneto-rheological elastomer.

3. The input device of claim 1, wherein the one or more material properties comprise at least one of stiffness, travel distance, or damping.

4. The input device of claim 3, wherein a value of each of the one or more material properties is user-defined.

5. The input device of claim 1, further comprising a proximity sensor operative to detect proximity of an object to the input surface.

6. The input device of claim 1, wherein the response of the input surface comprises a movement of the input surface in a direction in which an object is traveling toward the input surface.

7. The input device of claim 1, wherein the variable response material is one of a group of magneto-rheological materials adjacent the input surface.

8. The input device of claim 1, wherein the input surface is a surface of a trackpad.

9. The input device of claim 1, wherein the magnetic field source is an electromagnet.

10. A keyboard input device, comprising:
    a group of rigid keycaps having input surfaces, the keycaps each being configured to travel in response to an input force, the keycaps each being spaced apart from each other; and
    a variable response material disposed below each keycap, the variable response material associated with multiple input force response profiles for each input surface;
    wherein, when variable response material of a particular keycap of the group of rigid keycaps is subject to a magnetic field:
    a material property of the variable response material changes; and
    an input force response profile of the input surface of the particular keycap changes.

11. The keyboard input device of claim 10, wherein:
    the variable response material is a magneto-rheological material.

12. The keyboard input device of claim 10, wherein an elasticity of the variable response material decreases when the variable response material is subject to the magnetic field.

13. The keyboard input device of claim 10, wherein the material property is height.

14. The keyboard input device of claim 10, further comprising:
    a first electromagnet disposed adjacent a first side of the variable response material; and
    a second electromagnet disposed adjacent a second, non-opposing side of the variable response material.

15. The keyboard input device of claim 10, further comprising:
    a first set of electromagnets configured to subject the variable response material to a first magnetic field;
    a second set of electromagnets configured to subject the variable response material to a second magnetic field; and
    a proximity sensor configured to detect a proximity of an object adjacent the input surface; wherein:
    the material property is a stiffness;
    the variable response material is a magneto-rheological material;
    the stiffness decreases when subject to the first magnetic field; and
    the stiffness increases when subject to the second magnetic field.

16. An input device comprising:
    a group of input surfaces;
    a group of variable response materials, each of the group of variable response materials corresponding to one of the group of input surfaces and defining a unique input force response profile;
    a controller; and
    a magnetic field source controllable by the controller, the magnetic field source in magnetic communication with the group of variable response materials; wherein
    the controller is configured to adjust the unique input force response profile of each of the group of input surfaces by varying an electromagnetic field produced by the magnetic field source.

17. The input device of claim 16, wherein:
    the group of variable response materials comprise a magneto-rheological material;
    the magnetic field source is an electromagnet;
    each of the group of input surfaces is an input node; and
    each of the unique input force response profiles defines an elasticity and a damping for a unique one of the group of variable response materials.

18. The input device of claim 17, wherein the controller is further configured to adjust each unique input force response profile by adjusting at least one of the elasticity or the damping.

19. The input device of claim 16, wherein the group of input surfaces are disposed on a sphere.

20. The input device of claim 16, wherein each of the group of variable response materials affixes a corresponding one of the group of input surfaces to a corresponding substrate.

* * * * *